UNITED STATES PATENT OFFICE.

BRUNO KEETMAN, OF TREPTOW, NEAR BERLIN, AND FRITZ JOST, OF ORANIENBURG, NEAR BERLIN, GERMANY, ASSIGNORS TO DEUTSCHE GASGLUHLICHT AKTIEN-GESELLSCHAFT (AUERGESELLSCHAFT), OF BERLIN, GERMANY.

PROCESS OF OBTAINING SALTS OF MESOTHORIUM AND OF RADIUM FROM THORIUM-BEARING MINERALS.

1,100,743. Specification of Letters Patent. Patented June 23, 1914.

No Drawing. Application filed February 15, 1912. Serial No. 677,792.

*To all whom it may concern:*

Be it known that we, BRUNO KEETMAN and FRITZ JOST, both subjects of the German Emperor, and residents, respectively, of Treptow, near Berlin, Germany, and of Oranienburg, near Berlin, Germany, have invented new and useful Improvements in Processes of Obtaining Salts of Mesothorium and of Radium from Thorium-Bearing Minerals, of which the following is a specification.

Mesothorium and radium may be obtained from thorium-bearing minerals, for instance, monazite sand, which is the raw material for the manufacture of thorium. From such minerals mesothorium has been obtained by dissolving monazite sand with the aid of sulfuric acid, diluting the solution with water, and adding barium salts to the solution. The sulfuric acid solution being still relatively strong, barium sulfate is precipitated at once, and the yield of mesothorium is comparatively poor. This process therefore does not yield, even approximately, the theoretically recoverable amount of mesothorium, and for this reason is not applicable for industrial purposes.

According to another process proposed prior to our invention, monazite sand is dissolved with the aid of about the same quantity of sulfuric acid, and before and during the dissolving process, about 1% of any barium salt is added, it being immaterial whether the carbonate, the chlorid or the sulfate is used. The resulting sulfate of barium, radium, and mesothorium is dissolved by the hot concentrated sulfuric acid. Apparently there are formed the soluble bisulfates of barium, mesothorium, and radium, which upon the subsequent dilution with water are decomposed into monosulfates and are precipitated in a state of very fine division, while a part of the thorium, and the other rare earths remain in solution. The slime or mud settling above the gangue is finally subjected to a further treatment for the recovering of radium and of mesothorium. The process just described is not, however, applicable in conjunction with the manufacture of thorium. It is true that almost the entire contents of mesothorium and of radium are obtained in the mud or slime, but in order to recover the thorium, both the slime and the liquid separated from it would have to be subjected to an appropriate additional treatment, whereby the manufacture of thorium, radium, and mesothorium would become so complicated as to prevent its commercial use. It must also be borne in mind that the slime is obtained in rather large quantities so that a voluminous mass has to be treated to recover radium and mesothorium. These drawbacks are avoided by our present invention. As a starting material, we employ the liquid obtained in producing mesothorium and radium according to the well-known process, said liquid containing slime or mud in suspension above the gangue, and thorium as well as the other rare earths in solution. As is well known, this liquid is obtained by dissolving the mineral with the aid of concentrated sulfuric acid and of barium salts and diluting the solution with about the double or triple amount of water. Starting with this liquid, we proceed as follows according to our present invention. The liquid is stirred, which causes only the lighter particles of the mixture to become suspended in the liquid, the gangue, which consists of quartz and titanic iron, being left undissolved and remaining at the bottom. The suspension is siphoned off into suitable vats where its is diluted to about from thirty to sixty times the amount of the solution obtained with sulfuric acid. During this step the poorly soluble thorium phosphate is precipitated, as is also a portion of the cerite earths as phosphates, while the greater portion of the more readily soluble earths, such as cerium, didymium, etc., remains dissolved in the weakly acid liquid. Inasmuch as it is also desired to recover mesothorium and radium at the same time, the process just described, involving two successive dilutions with water will not be applicable without alteration, since the sulfate of barium, mesothorium and radium obtained in suspension by the first dilution, will be partly dissolved by the second dilution. To avoid this, we saturate the precipitating water (to be used for the second dilution) with barium sulfate, by adding the required amount of barium salts. An addition amounting to only one-third to two-thirds of the quantity of barium used in the dissolving process or step, will be sufficient. After being thus saturated with barium sulfate, the water is used as the diluent for the second dilution, and we thus avoid even a partial redissolving of the sulfate of barium, radium and mesothorium precipitated during the first part of the process. Such sulfates are therefore contained in almost theoretical quantity, in the crude thorium phosphate which, as described above, is precipitated during the second dilution. If the barium salts were not added, a large proportion of the radium and mesothorium (up to 60%) would be dissolved. Without the addition of barium salts, the sulfate of barium, radium and mesothorium would be dissolved in amounts corresponding to the increased quantity of liquid. It should also be borne in mind that sulfate of barium, radium, and mesothorium is soluble much more readily in diluted solutions of cerium and didymium salts than in pure water.

Example: 250 kilograms of monazite are subjected for eight hours at a temperature of from 220 to 250° centigrade, to the action of 300 kilograms of concentrated sulfuric acid, after adding 200 grams of barium sulfate or barium chlorid. The mass is allowed to cool to 40° centigrade and is poured the following day into 1½ cubic meters of cold water. The phosphates of thorium and of the rare earths remain dissolved in the dilute sulfuric acid, the lighter particles remain suspended in the liquid, and the gangue sinks to the bottom. The turbid liquid is siphoned off from the gangue and then further diluted with water to which barium chlorid has been added previously, as described above. In this particular instance, the amount of barium chlorid may be 0.12 kilograms and the quantity of water used for the second dilution, about 15 cubic meters. The sulfates of radium, mesothorium and barium are precipitated together with thorium phosphate. By an appropriate treatment of this precipitate, the sulfates of barium, mesothorium and radium may be recovered in a pure condition.

We claim as our invention—

The process of recoving salts of mesothorium and of radium in the production of thorium from thorium-bearing minerals, which consists in treating the minerals with barium salts and with concentrated sulfuric acid, then adding water to obtain a slimy or muddy product, and thereupon adding to said product an amount of water largely in excess of the amount of water contained in the slimy product, the water thus added to the slimy product containing a sufficient amount of barium salts to render the radioactive substances absolutely insoluble.

In testimony whereof, we have hereunto set our hands in the presence of two subscribing witnesses.

BRUNO KEETMAN.
FRITZ JOST.

Witnesses:
HENRY HASPER,
WOLDEMAR HAUPT.